June 9, 1942.   V. G. KLEIN ET AL   2,286,140
GUIDE
Filed June 17, 1940

Victor G. Klein,
Louis A. Reuter,
Inventors.
Haynes and Koenig,
Attorneys.

Patented June 9, 1942

2,286,140

UNITED STATES PATENT OFFICE 2,286,140

GUIDE

Victor G. Klein, St. Louis, and Louis A. Reuter, Normandy, Mo., assignors to Lincoln Engineering Company, St. Louis, Mo., a corporation of Missouri Application June 17, 1940, Serial No. 340,946

15 Claims. (Cl. 242—157)

This invention relates to guides, and with regard to certain more specific features, to guides for flexible lines such as hose and the like.

Among the several objects of the invention may be noted the provision of a guide to be used in connection with hose outlets in hose reels and the like, in which the hose (or other line) is smoothly guided and at the same time prevented from being abraded; and the provision of apparatus of the class described which is simple and reliable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
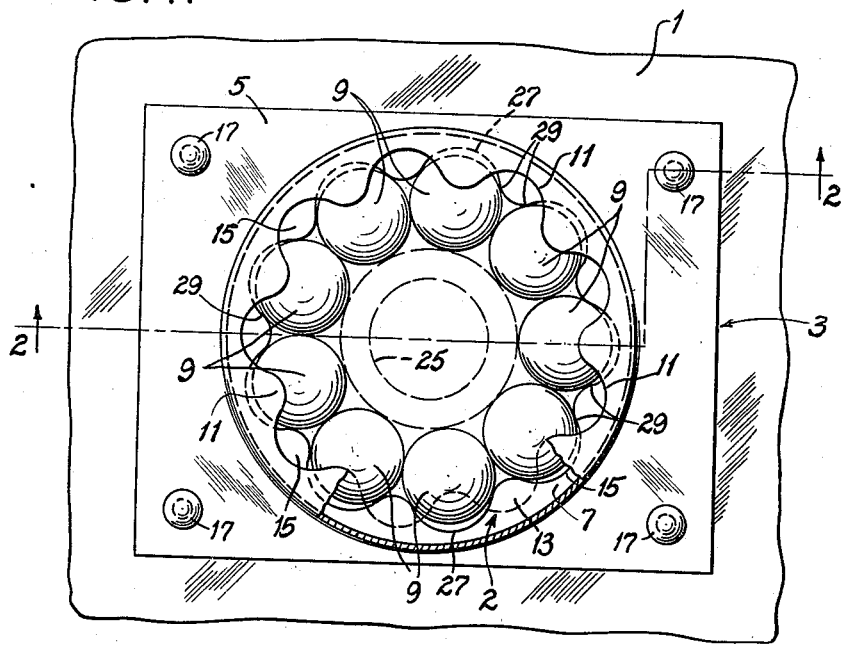
Figure 2:
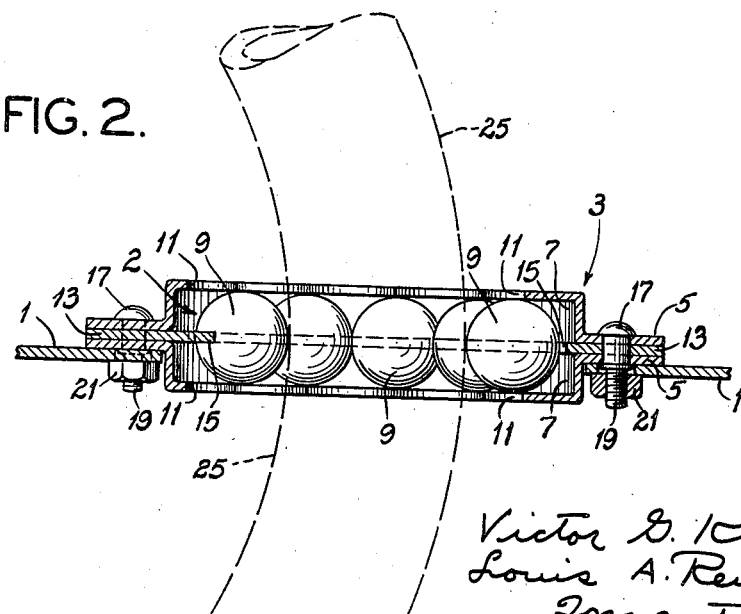

In the accompanying drawing, in which is illustrated one of various possible embodiments of the invention, Fig. 1 is a plan view of the device; and, Fig. 2 is a section taken on line 2—2 of Fig. 1.

Similar reference characters indicate corresponding parts throughout the several views of the drawing.

A use for the present device is indicated in a copending patent application of Frank S. Barks, Lutwin C. Rotter and Victor G. Klein, Serial No. 334,422, filed May 10, 1940, for Reel. Other uses exist and the above one is exemplary. In various places need arises for guiding a flexible line, such as a rubber hose, into and out of apparatus, the hose being pulled out and pulled in from time to time. The hose, being flexible and likely to be drawn out in various directions, bends in various directions and therefore should be guided so as to avoid abrasion.

Referring now more particularly to Fig. 1, there is shown at numeral 1 a horizontal support for the device 3. The device itself comprises two plates 5 which are stamped to form adjacent right-angular, annular pockets or cup-shaped members 7. The sum of the depths of pockets 7 is such as to hold balls 9 which are contained in the resulting annular recess or annulus. The portions 5 and 7 thus comprise oppositely located cup-shaped members which determine an annular recess 2. This recess is open inwardly, that is, it is inwardly directed.

The edge of each pocket 7 is scalloped as shown at 11, the two sets of scallops being oppositely located, as shown. These scallops also are directed inwardly.

Between the plates 5 is sandwiched a spacing plate 13, the edge of which is also scalloped as shown at 15. The member 13 extends like a fin into and between the annular recess formed by the part 7, scallops 15 providing supports at 29 for rotation thereon of the balls 9. This member 13 is in the recess formed by the pockets 7.

The center plate 13 and the plates 5 are held together by rivets 17 from which extend integral screw parts 19 for receiving holding nuts 21. By means of the screw parts 19, 21 the device is held to a supporting plate 13.

The central scallops 15 are staggered with respect to the oppositely located pairs of upper and lower scallops 11, so that the contained balls 9 are held prisoners in positions where they rest upon the lower set of scallops 11.

Another effect of the staggering of scallops is that contact is avoided between the hose 25 and the indented portions between the upper scallops 11 when the hose is pulled at a sharp angle in a plane midway between two of the balls. The same effect occurs when the hose feeds into the guide at an angle from below.

Each ball 9 is held peripherally by means of a pair of the central scallops 15 and vertically by means of a pair of the scallops 11. The balls are of course prevented from moving radially outward by the member 13, and are prevented from moving radially inward by interference among themselves. The radius of curvature of the pockets 27 between scallops 15 is less than that of the balls, so that the balls rest at two oppositely located paired points, such as indicated at 29. This reduces the rotary friction when the balls rotate under the longitudinal movement of the hose 25.

The device, being made entirely of stampings, permits of a very accurate location of the several balls and provides an easy way to manufacture the locating scallops.

Various hose diameters may be accommodated, the largest being shown in the drawing. Under circumstances of the use of smaller hose, the balls will not fall out, because the hose is not depended upon for holding them in position; that is to say, the balls contact each other laterally before they can fall radially away from the containing parts.

In view of the above, it will be seen that, when hose such as 25 is drawn on a bias through the device (as indicated for example in Fig. 2), the balls on the biased side of the hose will rest at the respective points 29, and tend to rotate thereon as the hose is moved axially. Limitation upon axial movement of the balls is determined by the upper and lower scallops 11. The balls on the opposite side of the hose have their inward motion limited to positions of mutual contact, or contact with the hose. These oppositely located balls may at this time break contact with the points 29.

The term "scallop" is herein intended to cover equivalent indented or crenelated edges.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A guide for hose and the like comprising means providing an inwardly directed open annular recess, rotary guide members in the recess, and a rigidly fixed member in the recess scalloped to provide portions extending respectively between adjacent ones of said rotary members.

2. A guide for hose and the like comprising means providing an inwardly directed open peripheral recess, said means having at least one scalloped edge, rotary balls in the recess, a fixed fin-like member in the recess having a scalloped edge forming means extending respectively between adjacent ones of said rotary balls.

3. A guide for hose and the like comprising means providing an inwardly directed open recess, said means having opposite scalloped edges next to the recess, rotary members supported in the recess, a fixed membed in the recess having a scalloped edge forming means extending respectively between adjacent ones of said rotary members to hold them in postions to be held prisoners by the scalloped edges of the annular recess.

4. A guide for hose and the like comprising means providing an inwardly directed open recess, said means having scalloped edges next to the recess, spherical members in the recess, a fin-like member in the recess having a scalloped edge forming means extending respectively between adjacent ones of said spherical members, the scallops of said edges next to the recess being opposite and those of the fin-like member staggered with respect thereto.

5. A guide for hose and the like comprising means providing an inwardly directed open recess, said means having scalloped edges next to the recess, spherical members in the recess, a fin-like member in the recess having a scalloped edge forming means extending respectively between adjacent ones of said spherical members, the scallops of said edges next to the recess being opposite one another and those in the fin-like member being staggered with respect thereto and arranged to provide spaced rotary supports for said spherical members.

6. A guide for hose and the like comprising means providing an inwardly directed open recess, said means having oppositely located scalloped edges next to the recess, rotary members in the recess, a fin-like member at the rotary members and in the recess, said fin-like member being scalloped in staggered relation to the first-named scallops and arranged to effect lateral spaced supports for the spherical members so that the rotary members become located opposite the said oppositely located scalloped edges.

7. A guide for hose and the like comprising means providing an inwardly directed open recess, said means having oppositely located scalloped edges next to the recess, spherical members in the recess located opposite the scallops, a fin-like member behind the spherical members and in the recess, said fin-like member being scalloped in staggered relation to the first-named scallops and arranged to effect lateral spaced supports for the spherical members.

8. A guide for hose and the like comprising means providing an inwardly directed open recess, said means having oppositely located scalloped edges next to the recess, spherical members in the recess, a fin-like member behind the spherical members and in the recess, said fin-like member being scalloped in staggered relation to the first-named scallops and arranged to effect lateral spaced supports for the spherical members, said spherical members being of the size that every spherical member contacts two adjacent spherical members mutually to prevent each other from falling from the annular recess.

9. A guide for hose and the like comprising oppositely located cup-shaped members forming an annular recess and having scalloped edges, a scalloped plate sandwiched between said members and extending into the annular recess, and balls in said recess of a size that each contacts two adjacent balls to prevent each other from falling therefrom.

10. A guide for hose and the like comprising oppositely located cup-shaped stampings forming an annular recess and having scalloped edges, a scalloped flat stamped plate sandwiched between said members and extending into the annular recess, and balls in said recess.

11. A guide for hose and the like comprising oppositely located cup-shaped members forming an annular recess and having scalloped edges, a flat plate sandwiched between said members and extending into the annular recess and having scallops staggered with respect to the scallops of the cup-shaped members, and balls in said recess.

12. A guide for hose and the like comprising oppositely located cup-shaped members having openings and forming an annular recess and having scalloped edges forming said openings, the scallops of which are oppositely located, a plate sandwiched between said members and having a scalloped edge extending into the annular recess, the scallops on the cup-shaped members being staggered with respect to those on the sandwiched member, and balls in the annular recess between scallops in the plate, being opposite scallops in the cup-shaped members.

13. A guide for hose and the like comprising oppositely located cup-shaped members having openings and forming an annular recess and having scalloped edges forming said openings, the scallops of which are oppositely located, a member sandwiched between said cup-shaped members and having a scalloped edge extending into the annular recess, the scallops on the cup-shaped members being oppositely located and those on the sandwiched member being staggered thereto, and balls in the annular recess, the portions between scallops on the sandwiched member clearing said balls to provide spaced regions of support for each ball.

14. A guide for hose and the like comprising oppositely located cup-shaped members having openings and forming an annular recess and having scalloped edges forming said openings, the scallops being oppositely located, a member between said members and having a scalloped edge extending into the annular recess, the scallops on the last-named member being staggered with respect to the scallops on the cup-shaped members, and balls in the annular recess, the portions between scallops on the member between said cup-shaped members clearing said balls to provide two regions of support for each ball, said balls being of a size that each contacts two adjacent balls to prevent inward movement from said opposite openings.

15. A guide for hose and the like comprising means providing an inwardly directed open recess, said means having edges next to the recess, spherical members in the recess, a fin-like member in the recess having a scalloped edge forming means extending respectively between adjacent ones of said spherical members, said edges next to the recess being formed as scallops which are located opposite one another and those in the fin-like member being staggered with respect thereto and arranged to provide spaced supports for rotary movement of said spherical members, said spherical members being each of a size that every spherical member in the absence of a hose contacts two adjacent spherical members.

VICTOR G. KLEIN.
LOUIS A. REUTER.